Figure 1:
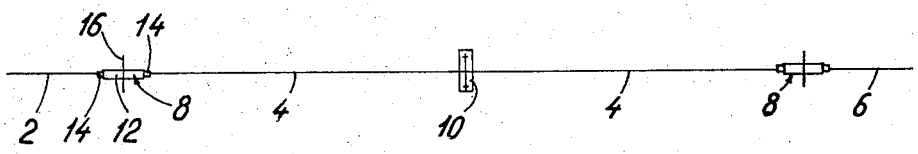

United States Patent [19]

Thastrup

[11] 3,866,953

[45] Feb. 18, 1975

[54] AXIAL PIPE COMPENSATORS

[75] Inventor: Ove Thastrup, Fredericia, Denmark

[73] Assignee: A/S E. Rasmussen, Fredericia, Denmark

[22] Filed: Apr. 25, 1972

[21] Appl. No.: 247,331

[52] U.S. Cl................... 285/47, 285/114, 285/301
[51] Int. Cl............................................. F16l 11/12
[58] Field of Search ........... 285/300, 301, 302, 114, 285/226, 23, 47

[56] References Cited
UNITED STATES PATENTS

| 337,037 | 3/1886 | White | 285/300 |
| 1,292,992 | 2/1919 | Bartram | 285/114 |
| 1,786,506 | 12/1930 | Ray | 285/301 X |
| 2,565,296 | 8/1951 | Chyle | 285/301 X |
| 3,232,640 | 2/1966 | Donkle | 285/226 X |
| 3,495,856 | 2/1970 | Daymond | 285/300 |
| 3,633,946 | 1/1972 | Kozmierski | 285/300 X |

FOREIGN PATENTS OR APPLICATIONS

| 735,334 | 5/1966 | Canada | 285/114 |

Primary Examiner—Dave W. Arola
Attorney, Agent, or Firm—Craig & Antonelli

[57] ABSTRACT

An axial compensator unit for mounting in a pipe system adapted to normally conduct a medium such as district heating water having a temperature higher than that at which the compensator unit is mounted in the system, the unit serving the purpose of enabling a linear portion of the pipe system to carry out thermal expansion and contraction without deviating from its linear condition, said compensator unit having a rectilinear bellow tube portion operable to be axially expanded and compressed from a normal or neutral position in which it is substantially without elastic tension, the opposed ends of this bellow tube being constituted by studs adapted to be welded or otherwise secured to the adjacent ends of two consecutive pipe lengths of said pipe system; according to the invention, between the said end studs of the compensator unit there is mounted in a releasable manner exterior connector means serving to temporarily—i.e. until after actual mounting of the unit in the system—holding the end studs in a mutual position in which the bellow tube is stretched out from its normal or neutral position to such an extent that after the mounting of the unit, after removal or release of the said connector means, and after the pipe system including the said unit having been heated to its normal operational temperature the bellow tube will assume a position identical with or close to its said normal or neutral position. Preferable the connector means are made so as to resist not only an axial pressure but also an axial pull; when resistant to axial pull the connector means may advantageously be left on the compensator unit until after the pipe system has been pressure tested whereby the connector means will prevent expansion of the bellow tube and consequently prevent substantial movement of the compensator unit in a transverse direction whereby it is not necessary to otherwise anchor the unit against lateral displacement by the pressure test.

7 Claims, 3 Drawing Figures

AXIAL PIPE COMPENSATORS

The present invention relates to pipe systems and more specifically to the construction and mounting of a so-called axial compensator serving to enable a long pipe length to carry out thermal movements in the axial direction without giving rise to lateral movements of the pipes. The same may be obtained by means of the so-called loop-type expansion joints, but these require considerable space and digging work in case of subterranean pipe systems such as for district heating water. More specifically the invention relates to an axial compensator unit for mounting in a pipe system and having a rectilinear length variable tube portion with end studs adapted to be welded or otherwise secured to the adjacent ends of two consecutive lengths of said pipe system, said length variable tube portion being constructed so as to be resiliently stretchable and compressible from a normal or neutral position in which it is substantially without elastic tension.

Usually a compensator unit of the kind considered comprises a metal bellow the ends of which are welded in between adjacent ends of consecutive pipe lengths in the system, each of these lengths being anchored to the ground or the surroundings approximately midways between its ends. In systems for hot water the pipe lengths will expand from the cold mounting condition, i.e. the bellows will be compressed axially to a normal operative condition. It is desired, however, that in this operative condition the bellows are assuming their natural state in which they were "born", i.e. a relaxed condition without permanent stress in the bellow material. From this neutral position the bellow may then be compressed or expanded within a reasonable range according to the temperature fluctuations during normal operation of the system. Of course, the bellows are strong enough to stand the widely expanded condition in which they are brought when the system is allowed to cool down, e.g. in connection with repair work on the system.

The compensators, of course, should be mounted in the system under relatively cold conditions, and in order to obtain a mounting thereof in the said neutral position it has been common practice to lay or mount the anchored pipe lengths in such a manner that the spacing between their neighbouring ends is somewhat bigger than the lengths of the compensator, whereafter the pipe lengths to be connected are stretched out, i.e. the neighbouring pipe ends are mechanically forced together sufficiently to match with the ends of the compensator, whereafter the compensator is secured by welding between the pipe ends. When thereafter the mechanical stretching of the pipe lenghts is relieved these lengths will retract themselves into the normal cold condition in which they expand the compensator correspondingly into its extreme cold condition. When the system is later heated for normal operation the pipe lengths will expand and thus return the compensators to their neutral working states.

Thus, in order to mount the compensators, it has been necessary to carry out a rather laborious work of mechanically stretching out the metal pipe lengths (or rather each pair of pipe length halves adjacent each compensator), and there are several difficulties and extra space requirements connected with doing this work in the field; also the anchoring of the pipe lengths shall be made extremely effective.

It is the purpose of this invention to provide a compensator and a method of mounting same which will highly facilitate the mounting work by making the said mechanical stretching work on the pipe lengths unnecessary.

According to the invention there is provided a compensator between the end studs of which there is mounted in a releasable manner means for temporarily holding the end studs in a mutual position, in which the length variable tube portion is stretched out from its said normal or neutral position. This compensator, which may under factory conditions be brought into its fixed, stretched out condition, may be of a length corresponding to the distance between the adjoining ends of two mounted pipe lengths, so that the pre-expanded compensator may be welded in between these ends without any stretching being applied to the pipe lengths. After this mounting of the compensator the said connector means may be removed or released, whereby the compensator itself will exert a pulling action on the opposed pipe length ends and thus cause the system to attain a state exactly corresponding to the situation after the mounting of the compensator according to the described known mounting method, but it will be appreciated that the stretching work on the pipe lengths can be entirely avoided, and that the prepared compensator unit can be mounted as simply as was it a short ordinary pipe length in a rigid pipe system.

Figure 2:
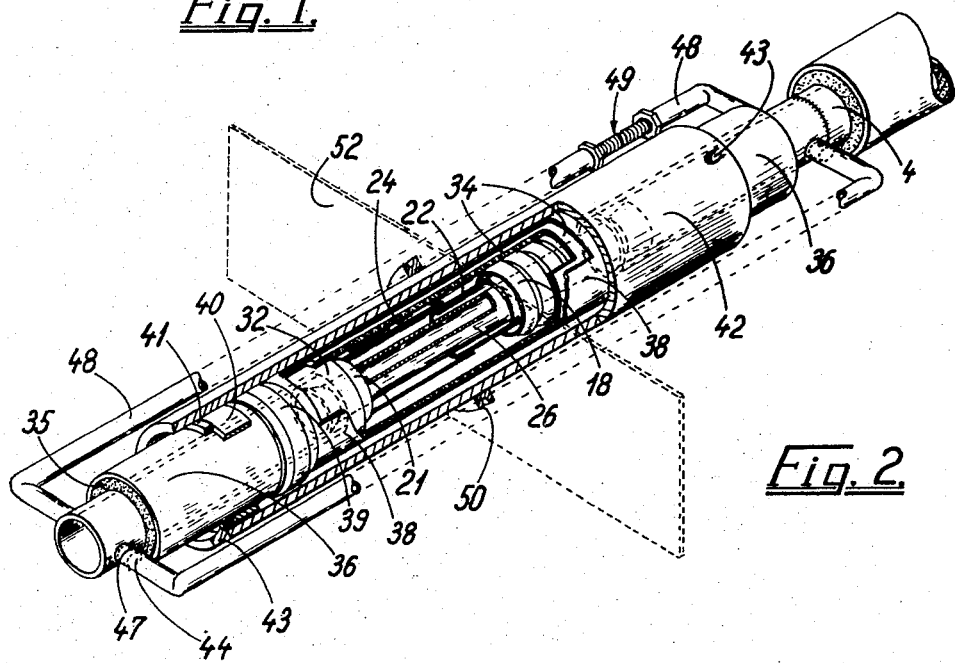
Figure 3:
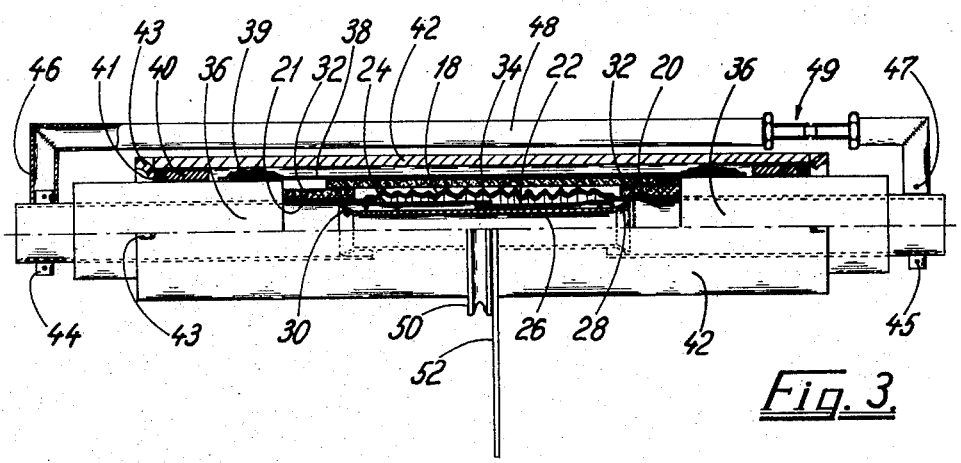

In the following the invention is explained in more detail with reference to the accompanying drawing, in which:

FIG. 1 is a schematic view of a part of a pipe system made of pipe lengths interconnected by means of compensator units, FIG. 2 is a perspective view, partly in section, of an embodiment of a compensator unit according to the invention, and FIG. 3 is a sectional view thereof.

FIG. 1 shows schematically three pipe lengths 2, 4 and 6 interconnected by means of two compensator units 8. A middle point of each pipe length as shown for the length 4 only, is anchored at 10 to the surroundings such as the ground in case of a subterranean district heating pipe system. The anchoring is effected e.g. by means of radial arms or plate members welded to the pipes and held in concrete blocks in the ground so that no axial displacement of the pipe can occur at these places.

The compensator units 8 generally comprise an outer tube 12 surrounding a metal bellow having projecting ends 14 which are welded to the ends of the pipe lengths. The compensators as hitherto used are placed in well openings, and the outer tubes 12 are provided with lateral projections 16 anchored to the surroundings. In the system according to the invention, however, the space requirements for the mounting of the compensators are small, so that a regular well at the joints will not be necessary, and the projections 16 may be anchored directly in the ground or even be entirely avoided.

As in other compensators the heart of the unit is a tube bellow 18, see FIGS. 2 and 3. This bellow is at either end secured to a tube piece 20, 21 respectively, by welding or otherwise, and these pieces 20 and 21 are adapted to be welded together with the ends of the tube lengths 2,4,6. In FIG. 2 the tube 4 is shown as a preinsulated tube. Inside the bellow 18, projecting inwardly from both ends thereof, there is arranged a guiding tube 22, respectively 24, these tubes overlapping each other telescopically; a further interior guiding tube 26 having opposed expanded end portions 28 and 30 is mounted with the end portion 28 welded to the interior side of the tube 20, whilst the other end portion 30 is slidably arranged inside the tube 21 at the other side of the compensator, as most clearly shown in FIG. 3.

The tube pieces 20 and 21 are surrounded by a cylindrical layer of insulating material 32, preferably provided as halfcylindrical insulating bowls or sleeves, and these portions and bridged by another tube 34 of insulating material and equally made as juxtaposed half-cylindrical insulating sleeves. Outside the outer ends of the insulation portions 32 the tubes 20 and 21 are surrounded by an insulating cylindrical portion 35 having an outer rigid protective tube 36, e.g. of hard plastecs. The length of the bridging tube 34 is smaller than the distance between the interior ends of the insulating portions 35 and 36. A hose of 38 of resilient artificial rubber such as Neoprene is mounted around the described parts with its ends clamped around the outer protective tubes 36 by means of suitable clamping rings 39. Outside these clamping ring means there is on each tube 36 provided a hard plastics ring 40 serving to support the ends of an exterior protective tube 42 which bridges the portions 36 without interlocking them axially. Adjacent the outer end of each ring 40 there is mounted a thicker ring 41 of a compressible sealing material such as sponge rubber. This ring serves to normally center the exterior tube 42 with its interior side spaced slightly from the exterior surface of the hard rings 40 and also from the exterior surface of the clamping ring means 39. In case of strong radial forces on the exterior tube 42 the tube end portions thereof will be pressed against the hard rings 40 so as to still be almost centered outside the inner portions of the compensator unit. The sealing rings 41 are held axially between the ends of the rings 40 and a number of inwardly protruding bosses 43 provided in the tube 42 adjacent the ends thereof.

The rubber sleeve 38 is an important element of the invention and serves to prevent moisture from entering from outside the space immediately around the bellow 18, i.e. serves as a corrosion protective means. The protective tube 42 is adapted to take up the earth pressure when the unit is installed directly in the ground; the construction is so that such a direct installation is possible.

In the production of the unit the interior guiding tube 26 is brought in position by first welding the collar portion 28 to the tube 20 (or rather to an end tube piece of the bellow which is thereafter welded to the tube 20), the other collar 30 being formed in a press with the tube 26 extending through the bellow, whereafter the other end tube piece of the bellow is welded to the other tube 21. The provision of the interior guiding tube 26 instead of an exterior guiding tube is important in that there is then provided space for sufficient heat insulation between the conductor tube and the rubber sleeve 38, or that the total thickness of the unit may be kept as low as possible.

The outer, exposed ends of the tubes 20 and 21 are provided with radial protrusions 44 serving to releasably receive the socket ends 46 of a pair of distance rods or tubes 48. The length of these rods or tubes is so adapted that they may interconnect the protrusions 44 at opposed ends of the unit when the compensator assumes a rather widely expanded position. Under factory conditions it is easy to bring the unit in this expanded position and then mount the distance tubes 48, so that the unit can leave the factory or a central workshop in this condition. The socket ends 46 of the tubes 48 may be secured temporarily to the protrusions 44 by means of locking pins 47 through aligned holes 45 in the tube ends and the protrusions 44, of course, the protrusions 44 may be substituted by hollow sockets or studs receiving the ends 46 of the connector tubes or rods.

As already mentioned the unit may thereafter be mounted in a pipe system simply by being welded in like any other pipe portion, whereafter the distance or holding tubes 48 are removed therefrom. Hereby the compensator will be free to retract itself with the results already described.

After the mounting the exterior tube 42 may be provided with a clamping ring 50 connected to opposed, radially outwardly projecting plate members 52 constituting the projections 16 already referred to in connection with FIG. 1. These anchoring means serve to hold the protective exterior tube 42 in its axial position in the system, but it has been found that the use of such anchoring means is not strictly necessary, since the end surfaces of the tubes 42 itself will normally be large enough to present a considerable resistance against axial movements in the adjoining ground material.

The protective tube 42 may be of increased length so as to overlap the tube portions 36 over a longer distance. Hereby the tube 42 may additionally serve to stabilize the unit in the axial direction so that the interior guiding tube 26 may be avoided. Preferably, the resilient hose or sleeve 38 is mounted so as to be substantially non-stretched and non-compressed when the compensator unit assumes its normal operative position, i.e. the sleeve 38 should be mounted in an axially compressed condition on the cold, non-stretched compensator unit.

The locking rods or tubes 48 may be substituted by other means such as only one rod or tube for temporarily holding the unit in its expanded condition. Besides, these means may be adjustable in length so as to enable an exact adjustment of the unit according to the requirements and the production tolerances of the unit. Such lengths adjustable means are shown at 49 in one of the connector rods 48. These means, in the example shown, are constituted by a screw spindle the opposed ends of which are received in the ends of aligned tube pieces 48 and having length adjustable nuts against which the ends of the tube pieces 48 abut whereby the total length of the tube pieces 48 is adjustable by adjusting the position of the nuts on the screw spindle.

Though as mentioned the connector rods 48 may be removed when the compensator has been mounted in the system it will be highly advantageous to let the rods remain mounted until the entire system has been pressure tested. As well known, a compensator unit should be anchored against radial movements during the pressure testing as a safeguard against a violent radial movement of the entire unit in case the pipe system is not exactly rectilinear, whereby the bellow is allowed to expand by the high pressure and thus enables the adjoining pipes to move into a mutual angular position. It will be appreciated that such safety anchoring of the unit is superfluous if the connector rods are not removed until after the pressure test, since they will not as a rigid pulling connection between the pipe ends and thus allow no or practically no radial movement of the unit. In this case, if length adjusting means corresponding to the screw spindle 49 are used in the connector rods or tubes 48 these means should of course be constructed so as to resist a pulling force; in the example shown the screw spindle 49 could be received in screw cut ends of the adjoining ends of the tubes 48.

What is claimed is:

1. An axial compensator unit comprising:
   a pair of end tubes axially spaced from one another, each one of said pair being adapted to be connected to respective end portions of longitudinally adjacent pipe sections, thereby joining said pipe sections together;
   an expandable bellows means for absorbing axial expansion and contraction forces on said pipe sections, said bellows means being secured to said pair of end tubes between said pair of end tubes;
   first and second guiding tubes disposed concentrically within said bellows means, each of said first and second guiding tubes being connected to respective ones of said pair of end tubes, said first and second guiding tubes being relatively movable with respect to one another;
   third guiding tube means concentrically mounted within said first and second guiding tubes, said third guiding means being secured to one of said pair of end tubes and relatively movable with respect to the other of said pair of end tubes;
   protective sleeve means of an elastomeric material for insulating said bellows means from moisture and corrosion, said protective sleeve means surrounding said bellows means and secured to said pair of end tubes;
   an exterior protective means for absorbing external pressure on the unit, said exterior protective means surrounding said elastomeric sleeve means and said bellows means, and said exterior protective means connected to said pair of end tubes; and
   at least one holding means for holding the unit in a predetermined arrangement; said holding means being connected to said pair of end tubes.

2. An axial compensator unit according to claim 1, wherein said first and second guiding tubes are disposed to move telescopically with respect to one another.

3. An axial compensator unit according to claim 1, wherein additional insulating means are arranged concentrically between said elastomeric sleeve means and said bellows means, said additional insulating means extending over at least a portion of said pair of end tubes.

4. An axial compensator unit according to claim 3, wherein said exterior protective means is connected to said pair of end tubes through said additional insulating means.

5. An axial compensator unit according to claim 1, wherein said holding means are longitudinally adjustable.

6. An axial compansator unit according to claim 1, wherein said holding means hold said unit in an expanded arrangement.

7. An axial compensator unit for mounting in a heating pipe system comprising
   a generally tubular bellow means having its opposed ends sealingly secured to respective axially aligned end tubes for respectively connecting the unit to respective end portions of pipes upon installation of the unit, said bellow means being of the resilient type having a neutral, tension-free position, from which it is axially compressible and expansible,
   guiding tube means disposed concentrically within said generally tubular bellow means and secured to one of said end tubes so as to constitute a telescopic guide between the opposed end tubes,
   protective sleeve means of an elastomeric material for insulating said bellows means from moisture and corrosion, said protective sleeve means being connected to said axially aligned end tubes to cover said bellows means,
   exterior protective means for absorbing external pressure on the unit, said exterior protective means being connected to said axially aligned end tubes to surround said elastomeric sleeve means and said bellows means, and
   exterior locking means extending axially outside said exterior protective means and connected with the respective opposed end tubes for preventing mutual axial movement of the end tubes, said locking means being connected in a releasable manner between the end tubes so as to releasably lock said end tubes in mutual positions to maintain said bellow means axially expansible from said neutral position prior to installation of the unit.

* * * * *